(12) United States Patent
Nilsson

(10) Patent No.: US 7,430,530 B2
(45) Date of Patent: Sep. 30, 2008

(54) METHOD AND A SYSTEM FOR AUTOMATED BOOK-KEEPING

(75) Inventor: Magnus Nilsson, Kullavik (SE)

(73) Assignee: Capaxis AB, Västra Frölunda (SE)

( * ) Notice: Subject to any disclaimer, the term of this patent is extended or adjusted under 35 U.S.C. 154(b) by 1645 days.

(21) Appl. No.: 09/780,504

(22) Filed: Feb. 12, 2001

(65) Prior Publication Data

US 2002/0111903 A1  Aug. 15, 2002

(51) Int. Cl.
*G07B 17/00*  (2006.01)
(52) U.S. Cl. ............................ 705/30; 705/33
(58) Field of Classification Search ............ 705/30, 705/33, 26
See application file for complete search history.

(56) References Cited

U.S. PATENT DOCUMENTS

| | | | | |
|---|---|---|---|---|
| 4,642,767 A | * | 2/1987 | Lerner | 705/30 |
| 5,390,113 A | * | 2/1995 | Sampson | 705/30 |
| 5,969,324 A | * | 10/1999 | Reber et al. | 235/462.13 |
| 6,085,173 A | * | 7/2000 | Suh | 705/30 |
| 6,330,545 B1 | * | 12/2001 | Suh | 705/30 |
| 2001/0027420 A1 | * | 10/2001 | Boublik et al. | 705/26 |
| 2001/0032154 A1 | * | 10/2001 | Schummer | 705/30 |

OTHER PUBLICATIONS

Anonymous, "Actuate: Actuate adopted as standard information delivery technology by Deutsche Bank's Corporate and Investment Banking arm; Banking giant to implement Actuate e Reporting throughout global operations" M2 Presswire, Aug. 23, 2001, 2 pages.*
Lake, Henrietta et al., "Sites to start up and sites to escape". The Times, London, United Kingdom, Nov. 6, 1999, pp. 54.*
Todd, Susan, "Patriot Will Launch Network Online for Community Banks Bankzip Will Help Smaller Institutions Join the Information Highway", The Morning Call, Allentown, PA., Oct. 5, 1999, pp. B07.*

* cited by examiner

*Primary Examiner*—Alexander Kalinowski
(74) *Attorney, Agent, or Firm*—Buchanan Ingersoll & Rooney PC

(57) ABSTRACT

The present invention relates to a method and a system for at least partly automated book keeping through a communication network such as the Internet. According to the inventive method data forwarded over Internet representing instructions for at least one transaction to be used in a banking service application is also used in an account service application.

20 Claims, 3 Drawing Sheets

Fig. 3

Utförda kontohändelser

| Bokf.datum | Betaldatum | Text | Belopp | Konteringstyp | Återstår | Exkl. | Inkl.avg. | Fakt.avg. | Moms | Lås |
|---|---|---|---|---|---|---|---|---|---|---|
| 2000-05-02 | 2000-05-12 | Bankgiro | -98 829,00 | Löner | -79 063,00 | 0,00 | 0,00 | 0,00 | 0,00 | |
| 2000-05-02 | 2000-05-12 | Skattemyndigheten | -24 588,00 | Varuinköp | -19 670,00 | 249,00 | 249,00 | 0,00 | -4 917,00 | |
| 2000-05-04 | 2000-05-12 BG 1651-1233 | | 16 524,25 | Försäljning, 1013 Storköp AB | 13 219,00 | -249,00 | -249,00 | 0,00 | 3 304,00 | |
| 2000-05-05 | 2000-05-12 | Fakturabet | 68 809,00 | Försäljning, 1014 Storköp AB | 55 047,00 | -249,00 | -249,00 | 0,00 | 13 761,00 | |
| 2000-05-05 | 2000-05-12 | Bankgiro | -4 873,00 | Kontorsmateriel | -3 898,00 | 120,00 | 0,00 | 0,00 | -974,00 | |
| 2000-05-05 | 2000-05-12 | Bankgiro | -8 321,00 | Firmabil | -6 656,00 | 0,00 | 0,00 | 0,00 | 0,00 | |
| 2000-05-09 | 2000-05-12 | Skattemyndigheten | -21 088,00 | Försäljning, 1017 Storköp AB | -16 870,00 | -249,00 | 0,00 | 0,00 | -4 217,00 | |
| 2000-05-12 | 2000-05-12 BG 1651-1233 | | 6 544,25 | Övrig Intäkt | 5 235,00 | 350,00 | 35,00 | 0,00 | 1 308,00 | |
| 2000-05-13 | 2000-05-12 | Fakturabet | 168 829,00 | Försäljning, 1019 Storköp AB | 135 063,00 | -249,00 | 0,00 | 0,00 | 33 765,00 | |
| 2000-05-16 | 2000-05-12 | Bankgiro | -38 231,00 | Varuinköp | -30 584,00 | 200,00 | 0,00 | 0,00 | -7 646,00 | |
| 2000-05-20 | 2000-05-12 BG 1651-1233 | | 3 354,25 | Försäljning, 1021 Storköp AB | 2 683,00 | -249,00 | 0,00 | 0,00 | 670,00 | |
| 2000-05-20 | 2000-05-12 BG 1651-1233 | | 12 544,25 | Försäljning, 1022 Storköp AB | 10 035,00 | -249,00 | 0,00 | 0,00 | 2 508,00 | |
| 2000-05-21 | 2000-05-12 | Fakturabet | 942,00 | Försäljning, 1023 Storköp AB | 673,00 | 249,00 | 0,00 | 0,00 | 168,00 | |

Kommande betalningsuppdrag

| Bokf.datum | Betaldatum | Text | Belopp | Konteringstyp | Återstår | Exkl. | Inkl.avg. | Fakt.avg. | Moms | Lås |
|---|---|---|---|---|---|---|---|---|---|---|
| 2000-06-01 | 2000-05-12 | Bankgiro | -28 877,00 | Varuinköp | -23 101,00 | 140,00 | 0,00 | 0,00 | -5 775,00 | |
| 2000-06-02 | 2000-05-12 | Skattemyndigheten | -22 238,00 | Kontorsmateriel | -17 790,00 | 0,00 | 0,00 | 0,00 | -4 447,00 | |
| 2000-06-03 | 2000-05-12 BG 1651-1233 | | 16 517,25 | Försäljning, 1033 Storköp AB | 13 213,00 | -249,00 | -249,00 | 0,00 | 3 303,00 | |
| 2000-06-11 | 2000-05-12 | Fakturabet | 38 325,00 | Försäljning, 1034 Storköp AB | ,00 | ,00 | -249,00 | 0,00 | ,00 | |
| 2000-06-12 | 2000-05-12 | Bankgiro | -68 726,00 | Försäljning, 1035 Storköp AB | -54 980,00 | -249,00 | -249,00 | 0,00 | -13 745,00 | |
| 2000-06-12 | 2000-05-12 | Skatt | -8 842,00 | | -7 073,00 | 0,00 | 0,00 | 0,00 | 0,00 | |
| 2000-07-17 | 2000-05-12 | Skattemyndigheten | -2 548,00 | Avancerad kontering | -2 036,00 | 0,00 | 0,00 | 0,00 | -509,00 | |

METHOD AND A SYSTEM FOR AUTOMATED BOOK-KEEPING

FIELD OF THE INVENTION

The present invention relates to a method and a system for at least partly automated book keeping through a communication network such as the Internet.

BACKGROUND OF THE INVENTION

Bookkeeping and accounting is normally a tedious and time-consuming work, whereas all the data has to be entered correctly into the bookkeeping database. Especially for smaller companies, this work is also normally done by people not specialised in this type of tasks, which raise a need for further education etc. Further, there is always a risk of incorrectness, such as erroneous data entries, miscalculations etc. This in turn makes the audit process more difficult and expensive.

It is therefore a need for an easier and more convenient way of handling bookkeeping and accounting, and preferably in an automatic or semi-automatic manner.

SUMMARY OF THE INVENTION

It is therefore an object of the present invention to provide a method and a system for accounting which alleviates at least some of the above-mentioned problems.

This object is achieved with a method and a system according to the appended claims.

According to the invention a method for at least partly automated book keeping, comprises:

providing a server with a banking service application and an account service application, said server being accessible to at least one client through an wide area network such as the Internet, wherein said account service application is connected to a book-keeping database, receiving to said server data representing instructions for at least one transaction, using said data in the banking service application for conducting the transaction, using at least part of said data as accounting information in the account service application for updating said book-keeping database.

With banking service application should in this context be understood any kind of application for managing and controlling bank services such as payments, withdrawals, money transfers etc.

With transactions should in the context of this application be understood events relate to a client's bank account.

With the inventive method, a vast education of the accounting workload is possible, since the data that is entered to the banking service application, is at least to a part reused for the accounting. This significantly lowers administration costs.

Further, the inventive method results in fewer errors in the accounting, since fewer data entries are required. Further, the bookkeeping database and the bank account balance are at least to a part automatically synchronised, since the same data are used, and the accounting is always in line with the bank account and sales/purchase ledgers. This makes the audit process easier and less costly.

For many companies, a large share of the transactions is directed to a limited number of suppliers, contractors and the like. In such a case, most transactions could be auto-booked with the inventive method, making the bookkeeping close to automatic.

Still further, the provision of the account service application in a central server makes it possible to use the same application for several clients, where each user only has access to his own book-keeping database. This facilitates up dating and maintenance of the account service application. Further, it makes it possible for several clients to access the same bookkeeping database. This is useful when several parries have an interest in the bookkeeping, such as parent companies and subsidiaries sharing the accounting services. It is further useful for external parties needing access to the bookkeeping, such as owners, creditors, auditors, accountants etc. It also becomes easier to outsource bookkeeping services.

By the inventive method, the bookkeeping also becomes simpler, since it becomes more natural and easy to understand. By the inventive method, simple transaction data could be entered, and at the same time a full double-entry accounting is produce in the background.

Preferably, the received transaction data is complemented with further account data, such as account identification and/or value added tax related to the transaction, connected to the transaction instruction data, in order to make the entry into the book-keeping database complete. Hereby, no subsequent completion of the bookkeeping is required.

Preferably, a network accessible document, such as a hypertext document, is transmitting in response to a request transmitted by the client to said server, said document comprising entering fields for formalised input of information of a user on the client side. Hereby, the input of the data becomes self-instructive for the user on the client side, and thus facilitate the process even further. The document could preferably be readable by a browser on the client.

On the Internet, hypertext documents (e.g. HTML documents) are linked to each other, constituting a complex structure, referred to as the World Wide Web (WWW). One document is called a WWW-page, a group of related documents is be called a WWW-site. To access the WWW-pages and sites, clients connected to the Internet are equipped with a hypertext interface, called a browser. Preferably, the server is a such WWW-page or WWW-site, whereby the Internet client is connected to the Internet and is adapted to receive the hypertext document.

Still further, it is preferred that the inventive method comprises searching of the book-keeping database for previously entered accounting data records similar to the received data regarding at least on predetermined parameter, and if such similar accounting data items are found, suggest additional accounting data to be stored in the book-keeping database in connection with the newly received accounting information in accordance with information in the found accounting data items.

Hereby, intelligence is built into the system, and intelligent suggestions based on previous entries are suggested to the client. This facilitates the data entry and the bookkeeping even further, and the usefulness of this feature increases over the time. The predetermined parameter could e.g. be the identity of the payment receiver, whereby the same additional a counting entries could be suggested as the last time the transaction was related to this receiver.

The invention also relates to a corresponding system for carrying out the above discussed method.

BRIEF DESCRIPTION OF THE DRAWINGS

For exemplifying purposes, the invention will be described in closer detail in the following with reference to embodiments thereof illustrated in the attached drawings, wherein:

FIG. 3 is an example of a formalised network accessible document user interface to be used for entry of data on the client side.

DESCRIPTION OF PREFERRED EMBODIMENTS

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
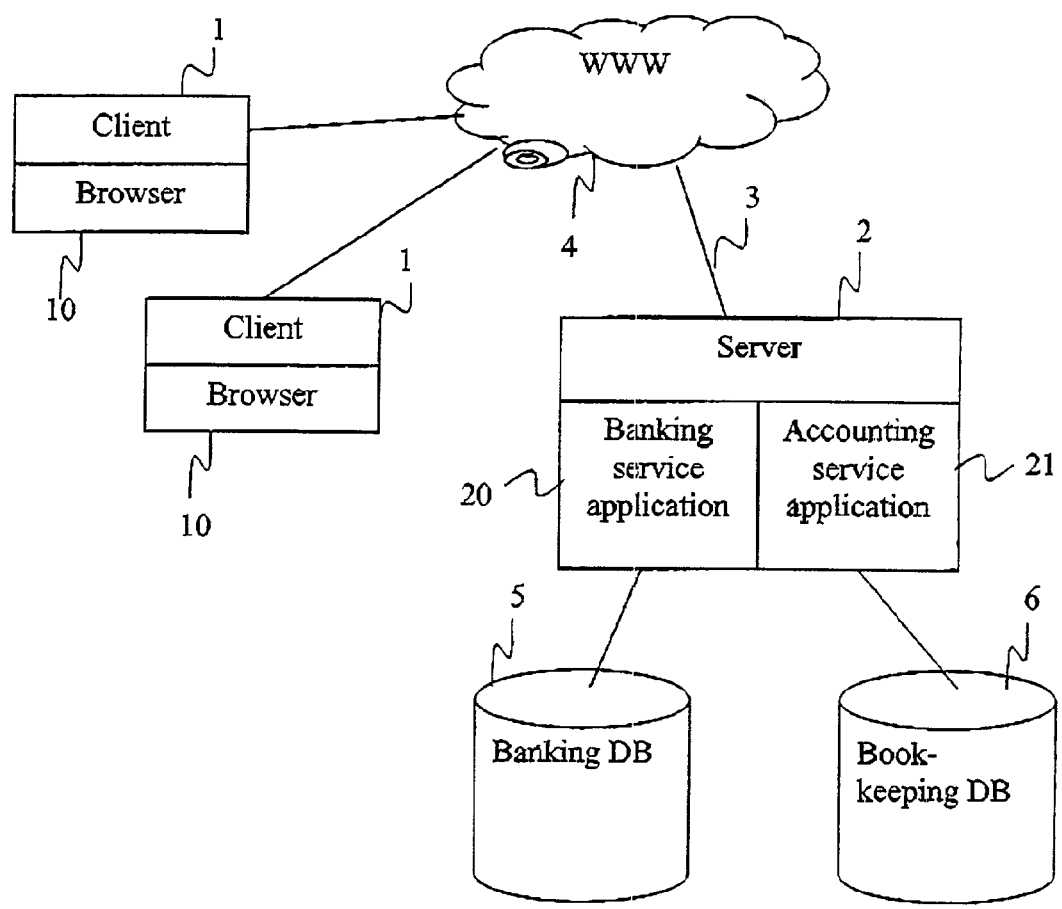
FIG. 1 represents an example of an environment in which the method according to the invention is applicable.

FIG. 1 shows a preferred environment in which the method according to the present invention is applicable. In FIG. 1, one or several clients 1 are connectable to a remote server 2 in a wide area network over a transmission line 3, using for example TCP/IP. The serve 2 preferably provides the client with network accessible documents upon request. In the illustrated example, the client is connectable to the remote server 2 via the Internet and the World Wide Web (WWW) 4 and the network accessible documents are dynamic hypertext documents, stored on the remote server 2. When a user connects the client 1 to the Internet, an Internet session is commenced, enabling the user to access documents from the server 2.

The client could for example be a conventional personal computer with a network connection. Further, it is preferably provided with means 10 for displaying hypertext documents, hereafter called a browser 10. The browser acts as an interface between the user and the WWW 4.

The server is preferably a modification of a conventional server for providing bank services over the Internet. To this end the server comprises a banking service application 20, which preferably is connected to a banking database 5, The banking service application could preferably provide usual banking services such as payments, money transfers etc. Such banking service applications are previously known, and are currently frequently employed.

According to the invention, the server further comprises a accounting service application 21, being connected and having access to a bookkeeping database 6. This bookkeeping application and bookkeeping database preferably provides the same functionality as conventional bookkeeping applications, and is further provided with a connection and synchronization with the banking service application.

Figure 2:
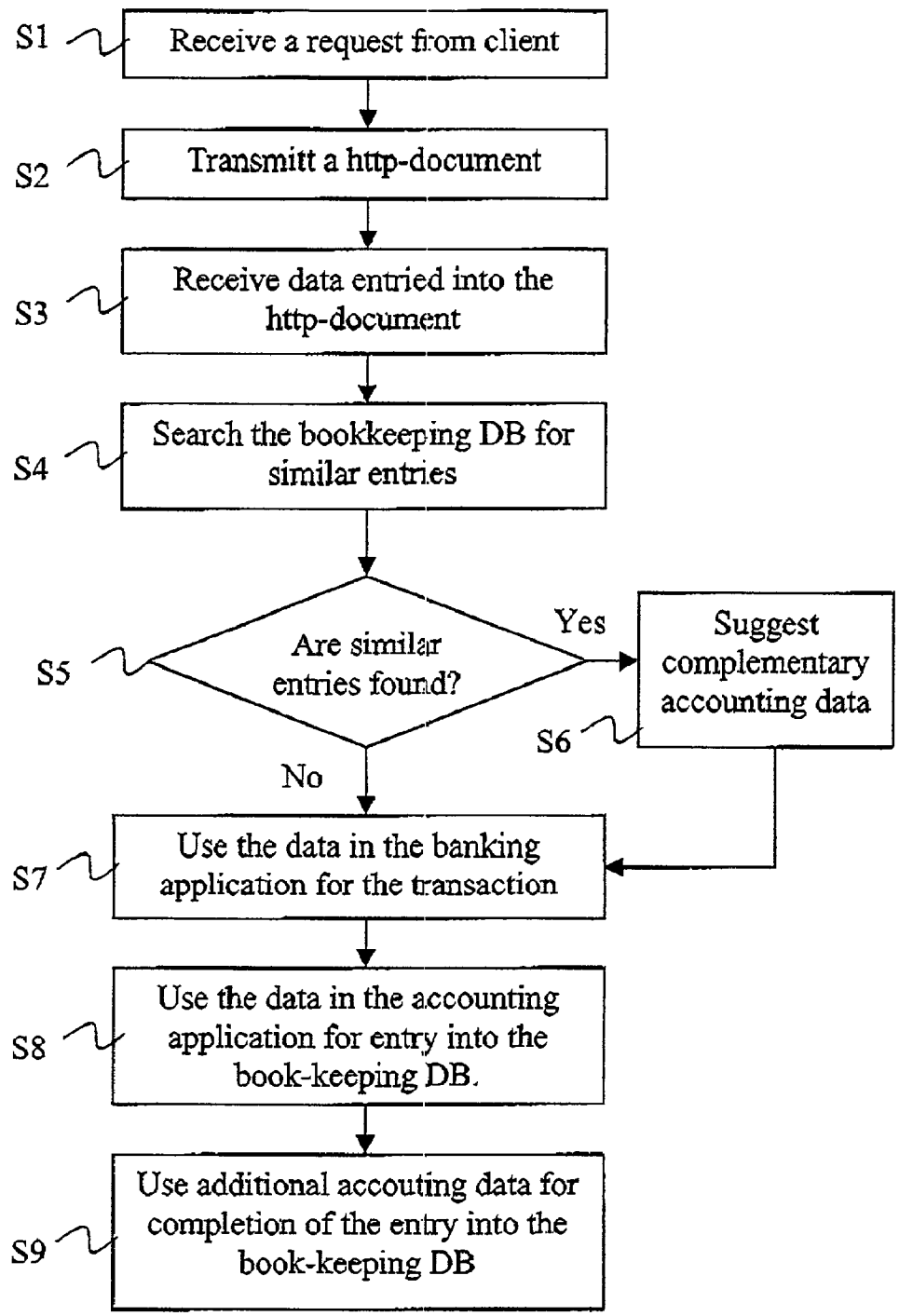
FIG. 2 is a schematic block diagram representing an embodiment of the inventive method.

The function of the above describe system and the method for at least partly automated bookkeeping according to the invention will now be discussed with reference to FIG. 2.

When the user sends a request to the server, e.g. by clicking on a hypertext link in a hypertext document, previously downloaded to the client, a request transmission S1 is made from the client to the remote server 2 providing the requested document, S2. Normally it is the browser 10 that executes this request transmission S1, hereafter referred to as a "request".

Data is then entered into the hypertext document by the user, S3, or by other means, and is then transferred to the server 2. The data comprises data representing instructions for at least one transaction, such as a payment, in a format applicable for use in the banking service application for conducting the transaction.

Preferably, the hypertext document comprises entering fields for formalised input of information of a user on the client side, as is discussed in more detail below.

In addition to the transaction data, the data preferably comprises additional thereto related accounting data, connected to the transaction instruction data. Such complementary account data could comprise account identification to be used in the bookkeeping information of value-added tax related to the transaction, etc. The additional information could preferably be entered in entering field in the same hypertext document used for entering the transaction data.

Preferably, the server performs the additional step of searching the book-keeping database or previously entered accounting data items similar to the received data regarding at least one predetermined parameter, S4. If such similar accounting data items are found, step S5, it suggest additional accounting data to be stored in the book-keeping database in connection with the newly received accounting information in accordance with information in the found accounting data items, step S6. The parameter to search for could e.g. be the identity of the payment receiver. Hereby, similar information need not be entered over and over again, but the system has an inherent intelligence and learning capacity.

Thereafter, the transaction data is used in the banking service application 20 for performing the transaction, step S7. Further, at least part of the transaction data together with the complementary accounting data is used by the accounting service application for entry into the bookkeeping database, step S8 and S9.

It should however be appreciated by those versed in the art, that the steps of the method discussed above may be performed in a different order, and some of the steps may even be omitted.

The transmission of information between the client and the server is preferably encoded by encoding means in a suitable way, enabling only the remote servers that have access to decoding means to have access to the information, and enabling only authorised users to have access to the banking and bookkeeping. Several methods for such secure transmission of information through networks and authorisation are known in the art.

With reference to FIG. 3, in embodiment of a hypertext document comprising entering fields for formalised input of information of a user on the client side comprises a table interface. The interface comprises a number of rows, each transaction being assigned one row. Further, the rows are preferably divided in at least two parts, one part DT comprising due transactions, and one part FT comprising future transactions. Which future and historic transactions to be shown could be determined according to standard or default settings, or be determined by the user. For example, the past transactions in a specific time period, such as the last month, could be displayed. However, it is also possible to display all past transactions where one account information is still missing and/or all transactions not "locked", i.e. still changeable, in the bookkeeping database.

The rows are preferably divided in a number of columns. A first category BC of the columns relates to the data coming from the banking service application. This category comprises columns relating to one or several of the following: transaction date; identity of the payer/payee; identity of the account to which the payment is due; and the amount and a text string attached to the transaction. However, other columns within this category are possible as well.

A second category AC of the columns relates to complementary data to be used by the accounting service application. This category comprises columns relating to one or several of the following: account date; account identification to be used in the bookkeeping; amount of the transaction related to value-added tax; balance on the current account; and amount of the transaction, related to freight or transportation. However, other columns within this category are possible as well. Still further, a column is preferably provide for locking the transaction data in the bookkeeping, i.e. making the corresponding bookkeeping record impossible to cancel or manipulate.

Entry of new data into the document could either be made by making a new row for entry of a new transaction or by entry of complementary data into one of the columns for an already existing transaction. New transactions could be entered manually or automatically by means of e-billing or other systems for electronic invoicing and billing.

For the entry of the complementary accounting data in the columns AC, the bookkeeping database is preferably searched for similar earlier entries, where after intelligent suggestions are made for simplification of the data entry. Preferably, the bookkeeping database are searched for earlier entries having at least one of the parameters defined in the data columns BC relating to the banking service. Which of the columns to use for the matching with the previously entered records in the bookkeeping database could be decided by the user, but is preferably determined by a default setting. Typically, the identity of the payer/payee and/or the account identity are used. The suggestions could be made by automatic entry of the suggested data, preferably in a marked manner such as in a different colour. Alternatively or as a complement, possible alternatives could be presented to the user in a list, in which the desired alternative could be marked. Preferably, this list is hidden and accessible by clicking on a button or the like. Such a list is especially useful in cases where several alternative suggestions are possible.

The transactions typically relate to payment of received invoices. However, in case the provider of the service also offers handling of outgoing invoices and outstanding debts, sales ledgers etc, such transactions may be entered in a similar way.

The banking service application and/or the accounting service application may further offer additional interfaces. Hereby, additional services may be provided. Especially, the accounting service application may offer an interface for accessing the bookkeeping data in a more conventional fashion.

Further, it is preferably possible to download a copy of the bookkeeping database to a client for revision, audits, follow-ups, etc.

With the invention an automatic syrchronisation between the bookkeeping data and the bark account balance is achieved, since the same basic data are used. Further the bookkeeping is made easier and more efficient.

The invention has now been described by way of example. However, several alternative embodiments are feasible, E.g. the invention may be use over other wide area networks than the Internet. Further, different ways of entering data may be used. Such closely related alternative embodiments must be considered to be within the scope of the application as defined by the attached claims.

The invention claimed is:

1. A method for at least partly automated bookkeeping, comprising:
    providing a server with a banking service application and an account service application, said server being accessible to at least one client through a wide area network, wherein said account service application is connected to a book-keeping database,
    receiving, at said server, data representing instructions for at least one transaction,
    using said data in the banking service application for conducting the transaction,
    using at least part of said data as accounting information in the account service application for updating said book-keeping database.

2. A method according to claim 1, wherein the transaction is a payment instruction.

3. A method according to claim 1, wherein the received data further comprises account data connected to the transaction instruction data.

4. A method according to claim 3, wherein the account data comprises account identification.

5. A method according to claim 3, wherein the account data comprises information of value-added tax related to the transaction.

6. A method according to claim 1, comprising the further step of transmitting a network accessible document, in response to a request transmitted by the client to said server, said document comprising entering fields for formalized input of information of a user on the client side.

7. A method according to claim 1, further comprising searching the book-keeping database for previously entered account data items similar to the received data regarding at least one predetermined parameter, and if such similar accounting data items are found, suggest additional accounting data to be stored in the book-keeping database in connection with the newly received accounting information in accordance with information in the found accounting data items.

8. A method according to claim 7, wherein the predetermined parameter is the identity of the payment receiver.

9. A system for at least partly automated book-keeping, comprising:
    a server, said server comprising a banking service application and an account service application, wherein the server is accessible to at least one client through an wide area network,
    a book-keeping database connected to said account service application,
    wherein said server is adapted to use data representing instructions for at least one transaction received through said network from said client in the banking service application for conducting the transaction, and further to use at least part of said data as accounting information in the account service application for updating said book-keeping database.

10. A method according to claim 2, wherein the received data further comprises account data connected to the transaction instruction data.

11. A method according to claim 10, wherein the account data comprises account information.

12. A method according to claim 10, wherein the account data comprises information of value-added tax related to the transaction.

13. A method according to claim 2, comprising the further step of transmitting a network accessible document in response to a request transmitted by the client and said server, said document comprising entering fields for formalized input of information of a user on the client side.

14. A method according to claim 3, comprising the further step of transmitting a network accessible document in response to a request transmitted by the client and said server, said document comprising entering fields for formalized input of information of a user on the client side.

15. A method according to claim 10, comprising the further step of transmitting a network accessible document in response to a request transmitted by the client and said server, said document comprising entering fields for formalized input of information of a user on the client side.

16. A method according to claim 4, comprising the further step of transmitting a network accessible document in response to a request transmitted by the client and said server, said document comprising entering fields for formalized input of information of a user on the client side.

17. A method according to claim 2, further comprising searching the book-keeping database for previously entered accounting data items similar to the received data regarding at least one predetermined parameter, and if such similar accounting data items are found, suggest additional accounting data to be stored in the book-keeping database in connection with the newly received accounting information in accordance with information in the found accounting data items.

18. A method according to claim 3, further comprising searching the book-keeping database for previously entered accounting data items similar to the received data regarding at least one predetermined parameter, and if such similar accounting data items are found, suggest additional accounting data to be stored in the book-keeping database in connection with the newly received accounting information in accordance with information in the found accounting data items.

19. A method according to claim 10, further comprising searching the book-keeping database for previously entered accounting data items similar to the received data regarding at least one predetermined parameter, and if such similar accounting data items are found, suggest additional accounting data to be stored in the book-keeping database in connection with the newly received accounting information in accordance with information in the found accounting data items.

20. A method according to claim 2, further comprising searching the book-keeping database for previously entered accounting data items similar to the received data regarding at least one predetermined parameter, and if such similar accounting data items are found, suggest additional accounting data to be stored in the book-keeping database in connection with the newly received accounting information in accordance with information in the found accounting data items.

* * * * *